May 24, 1949.    G. E. SHILALA    2,471,378
SOLID CONVERTIBLE TOP

Filed July 17, 1945    2 Sheets-Sheet 1

INVENTOR.

GEORGE E. SHILALA

BY *Victor J. Evans & Co.*

ATTORNEYS

May 24, 1949.　　　　G. E. SHILALA　　　　2,471,378
SOLID CONVERTIBLE TOP
Filed July 17, 1945　　　　　　　　　　　　　　2 Sheets-Sheet 2
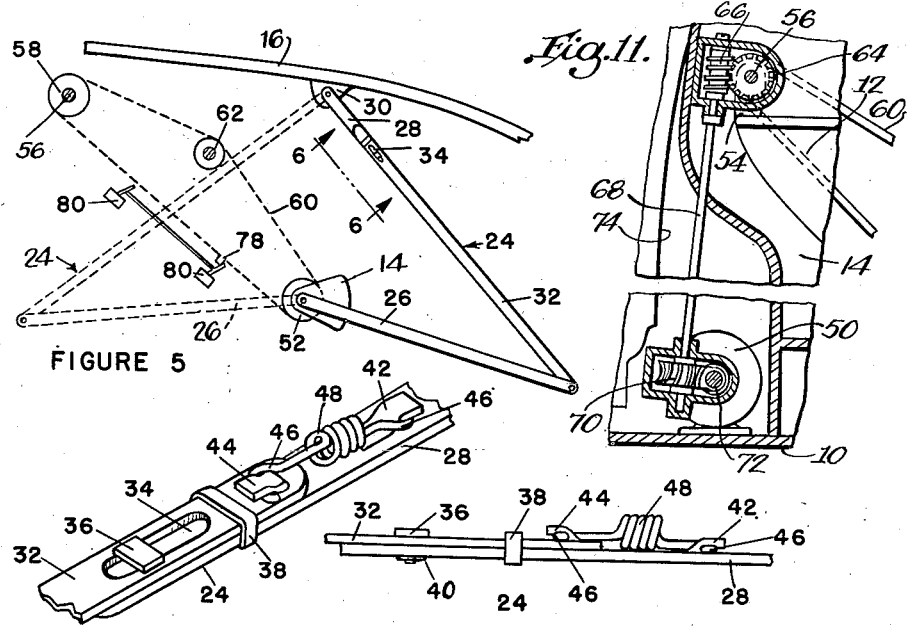
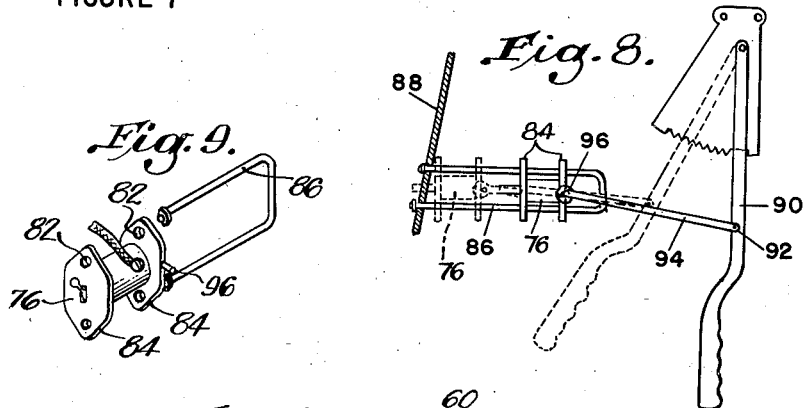
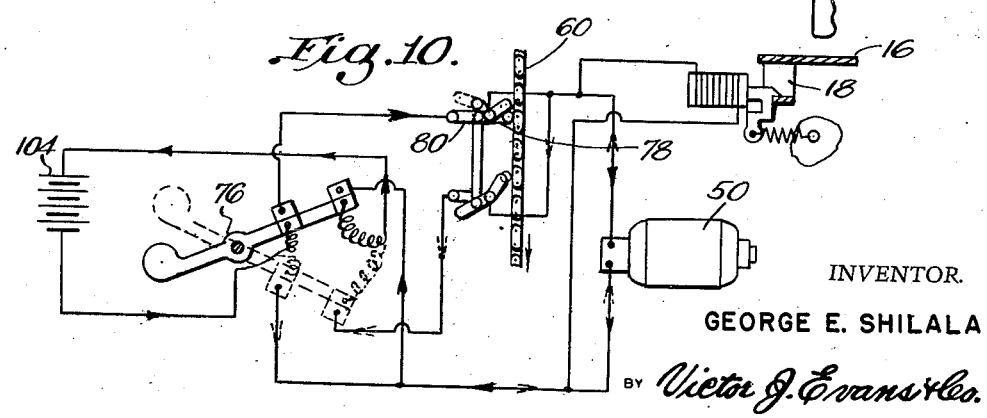
INVENTOR.
GEORGE E. SHILALA
BY *Victor J. Evans & Co.*
ATTORNEYS

Patented May 24, 1949

2,471,378

UNITED STATES PATENT OFFICE 2,471,378

SOLID CONVERTIBLE TOP

George E. Shilala, Los Angeles, Calif.

Application July 17, 1945, Serial No. 605,531

1 Claim. (Cl. 296—107)

This invention relates to a solid convertible top for automobiles.

At the present time most convertible automobiles are provided with collapsible tops made of canvas or other similar material. These tops are not durable, are difficult to operate and are not weather proof or tight when closed.

It is an object of this invention therefore to provide a solid type top that has the advantage of giving the occupants plenty of fresh air when open and when closed is weather proof and tight and comparable in comfort with a car made with an integral closed top.

The invention contemplates a rigid top that can be made of metal, glass, plastics or pressed wood, and so mounted in the auto body that it can be easily raised into operative position or just as easily returned within the body.

Another advantage of the invention is to provide a top that will possess the rugged features of a closed body type auto in that it wil be safer in case of an accident and the car should roll over on its top.

A further object of the invention is to provide a top that prevents theft of valuables in the car or of the car.

A still further object of the invention is to provide a convertible top that can be better weather proofed than are the present type of convertible tops in use.

When closed the top will present an attractive appearance conforming more to the appearance of a closed type of auto yet giving the advantage of an open type auto.

Figure 3:
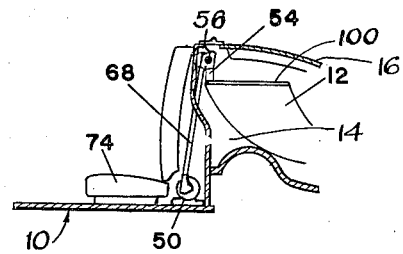
Figure 4:
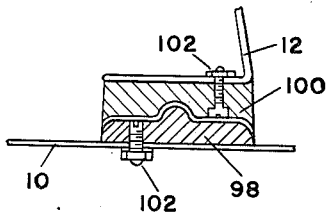
Figure 2:
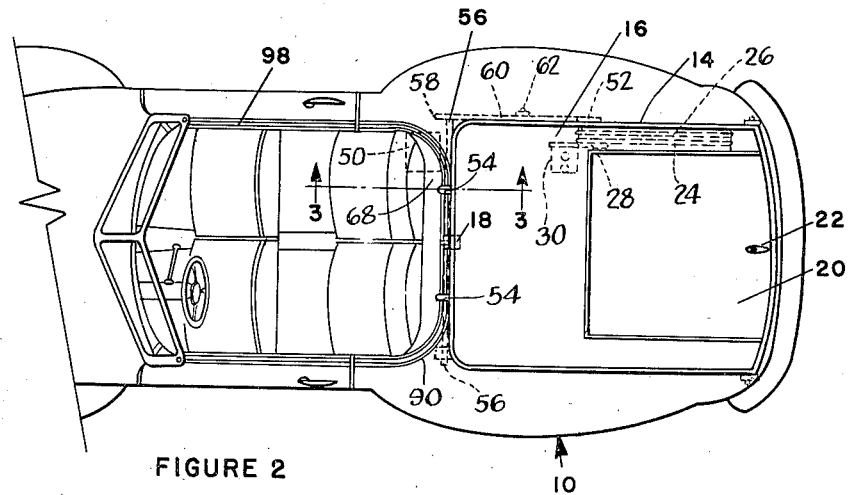
Figure 1:
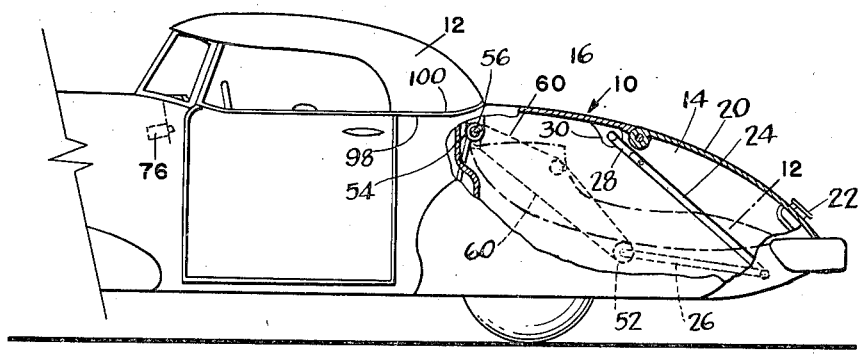

Other objects and advantages will appear as the description proceeds and points out the combination of elements and arrangement of parts which are clearly illustrated in the accompanying drawings in which:

Figure 1 is a side elevation of an automobile incorporating an embodiment of the invention with the top in closed position, Figure 2 is a top view of the same with the top in lowered or open position, Figure 3 is a sectional view on the line 3—3 of Figure 2, Figure 4 is a detailed sectional view of the weather stripping between the top and turtle back and body of the automobile;

Figure 5 is an enlarged detailed view showing the mechanism for controlling the top and turtle back of the automobile, Figure 6 is a sectional view on the line 6—6 of Figure 5, Figure 7 is a perspective view of Figure 6, Figure 8 is an enlarged detail view of the switch mechanism controlling the top and its coaction with the hand brake of the automobile, Figure 9 is a perspective view of the switch and control link therefor, Figure 10 is a diagrammatic representation of an electric circuit capable of controlling the actuation of the top and its associated parts, and Figure 11 is an enlarged elevational view, partly in section, of the mechanism for controlling the top and cover.

Referring more in detail to the drawings the numeral 10 generally designates a convertible type automobile having the movable roof or top portion 12 which as has been stated can be made from various materials.

The rear compartment 14 of the automobile 10 is normally closed by a turtle back cover 16 which is pivoted or hinged at its lower end in any conventional manner and provided with a lock 18 at its upper end.

In order to gain access to the rear compartment 14 the cover 16 is provided with a small lid 20 which is connected to the cover 16 by hinges in the conventional manner and is provided with the usual lock and handle 22.

The cover 16 is raised by means of links 24 and 26, which are arranged within the compartment 14 of the automobile 10.

The link 24 is a composite link having the short portion 28 pivotally connected to a depending ear 30 formed integral with or welded to the cover 16. The portion is slidably related with and connected to the long portion 32 at one end thereof, the other end of the portion 32 being pivotally connected to the link 26.

The portions 28 and 32 being slidably connected together by means of elongated slots 34 receiving a rectangular-headed bolt 36 which is of greater diameter than the slots 34 and a sleeve 38. The bolt 36 as usual is retained in place by a nut 40.

The portion 28 has a struck out projection 42 extending in a direction opposite to a struck out projection 44 in the portion 32.

The projections being adapted to receive the curved ends 46 of a spring 48.

This structure is incorporated in the link 24 to compensate for the overrun of the electric motor 50 which raises the top 12 and the cover 16 or for strains and stress between the top 12 and the cover 16.

The end of the link 26 not pivotally connected to the link 24 is provided with a sprocket gear 52 which is rotatably mounted on one of the interior side walls of the compartment 14.

The top 12 is provided with dependent ears 54 which are secured to a horizontally-disposed shaft 56 rotatably mounted in the compartment 14.

One end of shaft 56 is provided with a sprocket gear 58 which is rotatably connected to the sprocket gear 52 by a sprocket chain 60.

An idler sprocket gear 62 adjustably mounted on the side wall of the compartment 14 intermediate the gears 52 and 56 compensates for any slack occurring in the chain 60.

The other end of the shaft 56 is provided with a worm gear 64 which meshes with a worm 66 on the upper end of the inclined shaft 68 which is given bearing support in the rear wall of the compartment 14. The shaft 68 at its lower end has a worm gear 70 thereon meshing with a worm 72 on the shaft of the motor 50 which is mounted on the floor of the auto 10, immediately in the rear of the seat 74 thereof.

Thus when the motor 50 is actuated by a switch 76 the structure of which will be later described, the shaft 56 will be rotated through the worm 72 and worm gear 70 on the lower end of the shaft 68 and the worm 66 and gear 64 on the upper end thereof. The gear 58 will rotate gear 52 by means of the chain 60 and the cover 16 will be raised and the top 12 will be raised into closed position. The chain 60 is provided with a switch actuator 78 which actuates the switches 80 by contact therewith to stop the motor when the top 12 has assumed its two extreme positions.

The switch 76 is slidably mounted by means of aligned openings 82 in the ends 84 of the switch being received on the U-shaped guide bracket 86, which is secured to the dash board 88 of the automobile in alignment with the hand brake 90.

Pivoted to the hand brake 90 by means of a pivot pin 92 is a switch control rod 94 which is pivotally connected to the end 84 of the switch 76 by means of a pin 96.

Therefore when the brake 90 is on the switch 76 will be accessible but when the brake 90 is off the switch 76 cannot be operated to actuate the motor 50 to operate the top.

This is a very important safety feature of the invention.

To make the top weather proof the body 10 at the junction thereof with the top is provided with a chrome plated weather strip 98 which abuts and contacts the rubber weather strip 100, fastened to the edge of the top 12. The weather strips being retained in position by well known fastening means 102.

The circuit arrangement shown in Figure 10, includes the switch 76, a conventional reversing switch which when in up position will actuate the motor 50 to raise the top 12 in central or neutral position, the circuit is open and when the switch is down the top will go back into the compartment 14. As previously stated, this switch is mounted on the dashboard. The switch 76 has one terminal connected to the source of current, which in this instance is the battery 104 of the auto. One terminal leads to one of the limit switches 80, then to the motor 50 back to the other terminal of the switch 76. The lock 18 is electrically connected to the lines leading to the motor 50, and the lock is opened when the motor 50 is actuated.

Thus upon placing the switch 76 in up or down position the motor is actuated, the lock 18 is unlocked and the top 12 will be raised or lowered until one of the limit switches 80 is contacted whereupon the circuit will be broken, stopping the motor, but the other circuit will be made, for operation in the opposite direction when the switch is thrown in the opposite direction.

Thus it will be seen that there has been provided a construction by which the various objects and practical advantages are achieved.

The construction is practical, compact, easily operated and safe since it cannot be operated unless the auto has stopped and the brake applied.

Since many modifications and changes may be made in the embodiment set forth it is to be understood that changes may be made within the spirit of the invention and the scope of the appended claim.

Having thus described the invention what is claimed as new and desired to be secured by Letters Patent is:

In a vehicle body, the combination with a compartment in the rear of said body, a cover hingedly connected to the rear of said body and mounted for opening and closing movement with respect to said compartment, and a top hingedly connected to said body and mounted for pivotal movement into and out of said compartment, of a means for causing opening and closing movement of said cover, said means comprising a first link having one end pivotally connected to said cover, a second link having one end pivotally connected to the other end of said first link, a gear secured to the other end of said second link, a reversible motor mounted in said vehicle body, means including a chain and sprocket operatively connecting said motor to said gear for actuating said first and second links to cause opening and closing movement of said cover, and means operatively connecting said motor to said top for causing pivotal movement of the latter, said last-named means comprising a plurality of spaced ears secured to said top, a horizontally-disposed rotatable shaft supported in said vehicle body and secured to said ears, a worm gear journaled on an end of said shaft, a rotatable inclined shaft supported in said vehicle body, a worm mounted on the upper end of said inclined shaft and arranged in meshing engagement with the worm gear on said horizontally disposed shaft, and a worm gear on the lower end of said inclined shaft operatively connected to said motor.

GEORGE E. SHILALA.

REFERENCES CITED

The following references are of record in the file of this patent:

UNITED STATES PATENTS

| Number | Name | Date |
|---|---|---|
| 1,819,545 | Delp | Aug. 18, 1931 |
| 2,007,873 | Paulin | July 9, 1935 |
| 2,105,293 | Paulin | Jan. 11, 1938 |
| 2,111,885 | Cambessedes | Mar. 22, 1938 |
| 2,181,869 | Carr | Dec. 5, 1939 |
| 2,191,269 | Atwater | Feb. 20, 1940 |
| 2,215,363 | Rupple et al. | Sept. 17, 1940 |